Dec. 24, 1935. E. C. SAINT-JACQUES 2,025,402
APPARATUS FOR THE ROASTING OR THE CALCINATION OF PULVERULENT MATERIALS
Filed Dec. 8, 1933
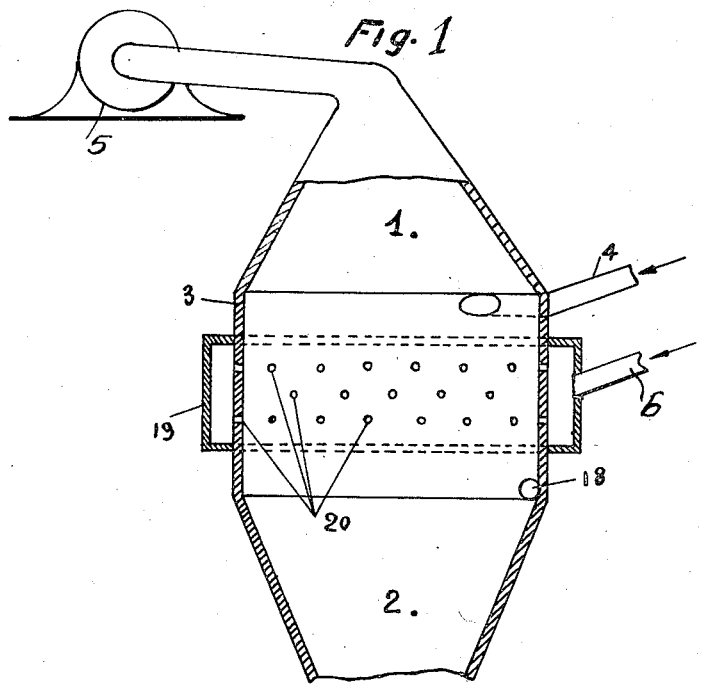
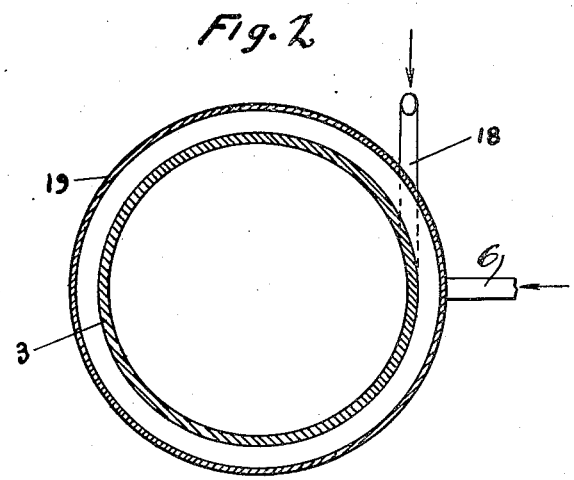
INVENTOR
Eugène C. Saint-Jacques
BY Townsend + Weekey
ATTORNEYS Patented Dec. 24, 1935

2,025,402

UNITED STATES PATENT OFFICE 2,025,402

APPARATUS FOR THE ROASTING OR THE CALCINATION OF PULVERULENT MATERIALS

Eugène Camille Saint-Jacques, Paris, France, assignor to Société Chantereine d'Applications Industrielles de Brevets, Paris, France, a corporation of France Application December 8, 1933, Serial No. 701,414
In France December 28, 1932

1 Claim. (Cl. 23—277)

The present invention has for its object the production of an apparatus for the roasting or the calcination of pulverulent materials, which constitutes an improvement of that previously described in U. S. A. Patent No. 1,893,913 of January 10, 1933.

In this earlier patent, it was indicated how the materials to be treated, in the pulverulent state, were put into suspension in the combustible gas or gas which supports combustion to ensure their roasting or their calcination, and how there was imparted to this mixture of gas and pulverulent materials a gyratory movement, while an upwards aspiration was produced in the direction of the axis of the circular trajectory followed by the mixture.

To effect this process there could be used an apparatus constituted by two opposed cones joined, for example, by a cylindrical portion, and the mixture of gas and materials could be injected tangentially into the interior of this cylindrical portion or its connection with the cones, a ventilator connected to the apex of the upper cone producing a depression or decrease of pressure at the axis of the apparatus.

In the Patent No. 1,893,913 it was likewise indicated how one or more tiers of gas supply pipes could be provided around the cylindrical portion of the apparatus, below the supply pipe of the materials to be treated, for the purpose of supplying burners distributed around this cylindrical portion, and in order to cause the materials to be in contact during their whole passage in this cylindrical portion, with combustible gas or gas supporting combustion, in order to assure a more perfect calcination or roasting.

Instead of several burners, it is possible in accordance with the present invention to provide only one, discharging, preferably tangentially, into the cylindrical portion of the apparatus, below the level of supply of the materials and fed with gas or oil residue or heavy oil, or also with pulverized combustible material.

It is possible in addition to provide a supply of combustion air under pressure through openings provided in the cylindrical portion of the apparatus.

The advantage of this latter arrangement is to permit of reducing considerably the depression which is exerted in the upper portion of the apparatus and thus to avoid among other things the too rapid entrainment of material while assuring a calcination or roasting which is much more regular and complete.

The invention is illustrated by way of example in the accompanying drawing, in which Figure 1 is a sectional elevation of the apparatus and Figure 2 is a horizontal section taken through the jacket 19 of Fig. 1.

1 and 2 are the two cones of the apparatus connected by a cylindrical portion 3, and 4 is the supply pipe of the materials to be treated.

In accordance with the invention there is provided at 18 a burner for gas, heavy oil, pulverized combustible material or the like, the flame of which enters tangentially into the cylindrical portion 3. A conventional form of aspirator 5 comprising a suction pump is connected to the upper cone as shown and the diminution of air pressure in the cylindrical portion 3 produced by said aspirator causes the flame from the burner 18 to rise during the functioning of the apparatus and in such manner as to come into intimate contact with the gyratory current of the materials to be treated. For increasing the contact between the flame and the materials to be treated the supply pipe 4 and the burner 18 are directed in opposite directions, if considered with respect to the vertical axis of the apparatus, both tangential to the cylindrical portion 3. In other words, the supply pipe 4 may project into the reaction chamber in a clockwise direction and the burner 18 in a counter-clockwise direction or vice versa as desired.

The necessary combustion air is introduced by a suitable pipe 6 under pressure into an annular chamber 19 from whence it penetrates into the apparatus through the free orifices 20.

Obviously, according to the materials to be treated and the type of operation in view, the burner and the combustion air under pressure will be employed simultaneously, or the latter may be employed alone.

What I claim is:—

An apparatus for heat treating pulverulent materials comprising a vertical reaction chamber formed of two superposed cones arranged in opposition, a cylindrical portion joining the edges of the upper and lower cones, means for tangentially injecting the pulverulent materials to be treated, a burner below said injecting means and opening tangentially into said cylindrical portion and extending, with respect to the vertical axis of the apparatus, in a direction opposite to that of the injecting means, an annular chamber surrounding said cylindrical portion, means for feeding combustion fluid under pressure to said chamber, said cylindrical portion having openings to provide communication between said surrounding chamber and the interior of the cylindrical portion and means for creating an aspiration at the apex of the upper cone along the axis of the reaction chamber.

EUGÈNE CAMILLE SAINT-JACQUES.